June 19, 1956  F. BERRY  2,750,891
ROTARY POWER DEVICE OF THE ROTARY ABUTMENT TYPE
Filed Dec. 9, 1952  3 Sheets-Sheet 1

INVENTOR.
FRANK BERRY
BY
Pollard, Johnston, Smythe & Robertson
ATTORNEYS

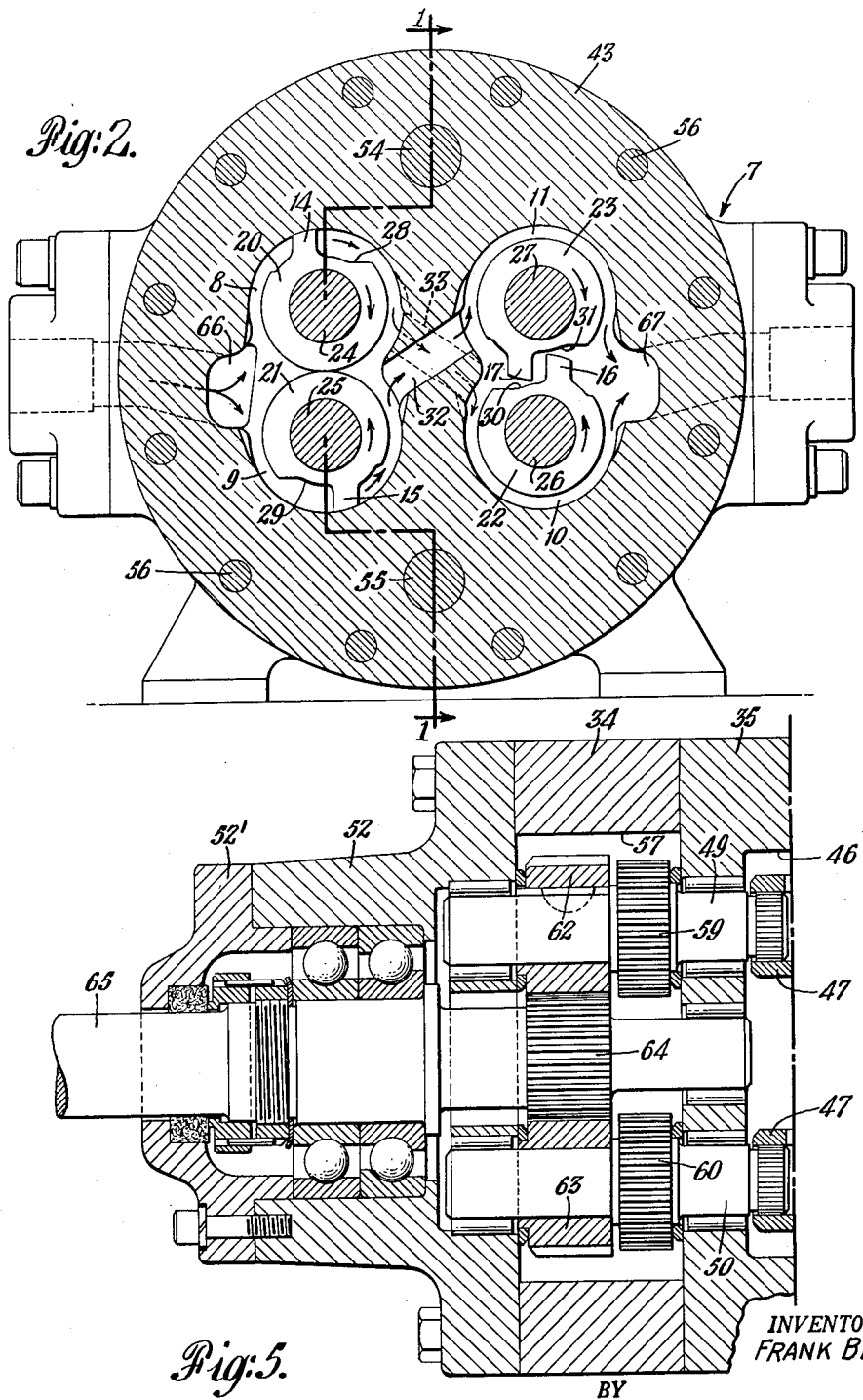

June 19, 1956 F. BERRY 2,750,891
ROTARY POWER DEVICE OF THE ROTARY ABUTMENT TYPE
Filed Dec. 9, 1952 3 Sheets-Sheet 3

INVENTOR.
FRANK BERRY
BY
Pollard, Johnston, Smythe & Robertson
ATTORNEYS

United States Patent Office 2,750,891
Patented June 19, 1956

2,750,891

ROTARY POWER DEVICE OF THE ROTARY ABUTMENT TYPE

Frank Berry, Corinth, Miss., assignor to Oliver Iron and Steel Corporation, Pittsburgh, Pa., a corporation of Pennsylvania Application December 9, 1952, Serial No. 324,943

6 Claims. (Cl. 103—5)

The invention relates to rotary fluid power devices of the rotary abutment type, and is applicable to hydraulic pumps, motors and transmissions, compressors, fluid expansion motors, etc.

Rotary abutment power units in general comprise a casing having annular cylinders, a rotor shaft carrying piston rotors with pistons slidably arranged to traverse the respective annular cylinders in rotary movement, and a cylindrical abutment arranged in the casing with its axis parallel to the axis of the rotor shaft, the abutment having recesses to clear the pistons as they pass the abutment. As examples of this general type of unit, reference is made to my prior Patents No. 2,464,481, granted March 15, 1949, and No. 2,536,486, granted January 2, 1951.

Summary

According to my invention, two pairs (or more) of such annular cylinders are provided, and the cylindrical abutments and recesses are formed as elements fixed to each piston, or piston rotor shaft, with the recess adjacent the piston, the annular cylinders being arranged in pairs with the pistons and recesses of each pair arranged so that the piston of one cylinder of the pair clears through the recess of the other cylinder of the pair while the piston of said other cylinder clears through the recess of the first. The outlets of the one pair of cylinders are connected to the inlets of the other pair, and the pistons of the one pair are timed 180° apart from those of the other pair so that the one pair of pistons are in operation in their respective cylinders while the other pair of pistons are "valving" through their respective abutment recesses.

With this arrangement it becomes unnecessary to provide separate abutment rotors for the piston rotors. Instead, each piston rotor is made to serve double duty, first as a piston rotor and second as a rotary abutment. Thus in my basic four cylinder unit there are required only four moving parts, each of which carries a piston, and there is no separate abutment valve. Hence, every moving part comprises a power element and all valving is accomplished by the piston rotor part. From this characteristic is derived the short-hand description of my new rotary power unit as the "integral valve unit," the valve in a sense being an integral part of the piston rotor. Of course it is not essential that it be integral in the sense of being made in a single piece with the piston, for it is enough that the valve and piston be fixed to one another to function as a single part regardless of the particular manner of fabrication of the combined valve and piston element, or whether that element is, in turn, integral with the rotor shaft or affixed thereto.

From the foregoing it will be understood that my power unit has the advantage of eliminating the need for a separate abutment valve while at the same time performing the complete functions of the former units which did require the use of such separate abutment valves. Thus I have made it possible to dispense with one rotating part which did not contribute to power output, yet which formerly was considered necessary to the operation of rotary abutment power devices.

Another advantage of my invention resides in its extreme simplicity and ease of manufacture. Every movable part can be of identical form to every other movable part, i. e., all power rotors can be of identical design, and, since there are no separate abutment valves required, the manufacturing tolerances can be more liberal. In the complete unit there are fewer design components. Since an idling abutment valve is replaced by a power rotor, the capacity output is greatly increased for a given size of unit.

Description

In the drawings which illustrate what I now consider to be the preferred form of my invention as applied to a pump or motor:

Fig. 2 is a vertical transverse cross-sectional view through two pairs of annular cylinders taken as indicated at 2—2 in Fig. 1;

Fig. 5 is a detail sectional view taken as indicated at 5—5 in Fig. 3; and

Figures 1, 6:
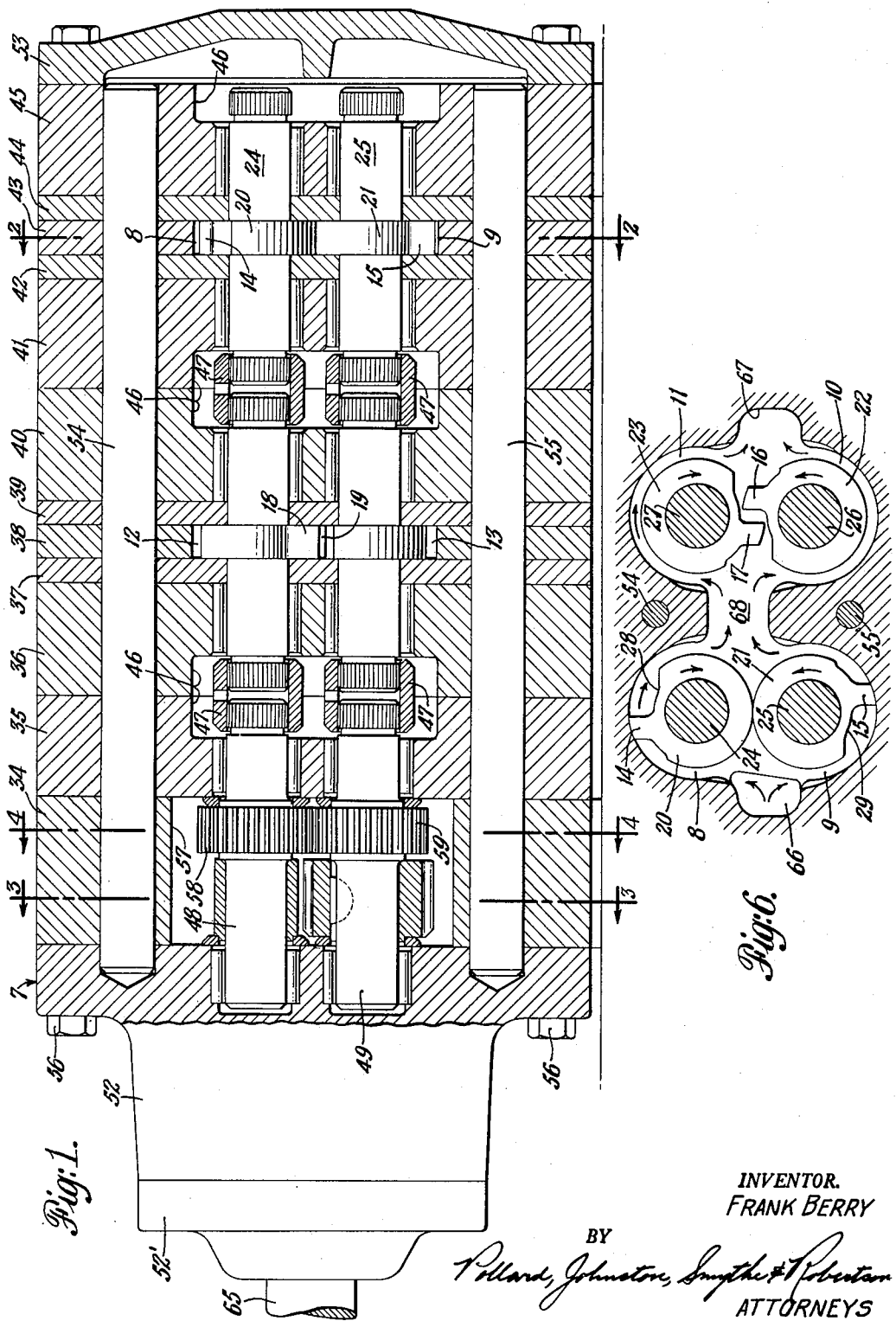
Fig. 1 is a vertical longitudinal cross-sectional view illustrating the general arrangement.
Fig. 6 is a view similar to Fig. 2 showing the main operating elements of a slightly modified construction.

In the description of the drawings to follow, I shall for the sake of simplicity, generally refer only to pumps but it should be understood that the constructions described may be operated as motors. Further, the invention to be described is applicable to fluid power units in general, inclusive of units in which the operating fluid is compressible or expandable, as well as units in which the operating fluid is non-compressible. Included in the first category are air motors, compressors and expanders, and included in the second category are hydraulic pumps, motors, transmissions, etc. In the case of units in which the fluid is compressible, the basic unit described can be staged or compounded in known manner and may utilize the principles and invention of my prior Patent No. 2,447,929, granted August 24, 1948, the disclosure of which is here incorporated by reference. Therefore it will be understood that the invention disclosed herein is applicable to rotary fluid power devices of the rotary abutment type in general, inclusive of hydraulic pumps, motors and transmissions, compressors, fluid expansion motors and so on; also that the mechanism selected as illustrative of my preferred embodiment is properly to be regarded as either a hydraulic pump or motor or as a component of hydraulic transmissions or power converters embodying such pumps or motors.

This preferred construction comprises in its general arrangement a casing 7 made up of a series of plates, this casing having axially arranged sets of annular cylinders, one set of which is shown at 8 to 11 inclusive, and two cylinders of a second similar set of cylinders being shown at 12 and 13. Pistons 14 to 19 inclusive are arranged to traverse the respective annular cylinders in rotary movement and each is fixed to the shaft disposed centrally in the respective cylinders. In my preferred construction the pistons are fixed to the shafts through rotor rings integral with the shafts. Taking the pistons of the one set of cylinders shown in Fig. 2 for example, pistons 14 to 17 inclusive are formed integrally with rotor rings 20 to 23 inclusive, which in turn are formed integrally with shafts 24 to 27 inclusive.

Each shaft has an abutment section with a recess therein. However I do not wish to be limited to this particular construction as it is possible in certain types of units to have the shafts for each pair of cylinders arranged in direct rolling contact, i. e. without any piston rotors as such, but with the recesses 28, 29, etc. formed directly in the shafts as distinguished from forming them in separate or integral rings on the shafts. In the specific embodiment shown the abutment sections are comprised by the rotor rings 20 to 23 inclusive, and the abutment recesses 28 to 31 inclusive are formed therein. Thus the cylindrical abutments and recesses are formed as elements fixed to each piston, with the recess adjacent the piston. The annular cylinders are arranged in pairs 8, 9 and 10, 11 with the pistons and recesses of each pair arranged so that the piston of one cylinder of the pair clears through the recess of the other cylinder of the pair, while the piston of said other cylinder clears through the recess of the first. This condition is illustrated in the right-hand pair of cylinders 10, 11 (Fig. 2) in which piston 16 is clearing through the recess 31 while piston 17 is clearing through recess 30. A fluid passage connects the outlets of the one pair of cylinders 8, 9 to the inlets of the other pair of cylinders 10, 11.

In my preferred construction this fluid passage comprises two channels 32, 33. The pistons 14, 15 of the one pair of cylinders are in operation in their respective cylinders when the pistons 16, 17 of the other pair of cylinders are passing through the recesses of the respective abutment sections, this being the condition illustrated with the parts in the position shown in Fig. 2. After the movable parts have rotated 180° from the position there shown, the condition will be reversed in that pistons 16 and 17 of the second pair will be in operation in their respective cylinders when the pistons 14, 15 of the first pair are passing through the recesses of the respective abutment sections. In this preferred construction the pistons of the first pair of cylinders are in their power stroke during approximately 180° of the cycle, and at this time the pistons of the second pair of cylinders are passing through the abutment recesses and are not working. During the remaining 180° of the cycle, the situation reverses, the pistons of the second pair of cylinders being in their power stroke, and those of the first pair are then passing through the valve and are not working. Thus each pair of pistons may be said to "valve" those of the other pair. Moreover the pistons of each pair supplement one another in their action. The relationship between the working strokes of the pistons of the two pairs is such that each pair of pistons is operating for approximately 50% of the time and during the time that the other pair of pistons is valving through the abutment recesses. Each pair of pistons in this way valves the other pair of pistons, and in the case of an hydraulic unit a continuous stream of liquid is caused to flow through the unit with a minimum of pulsation.

In analyzing the operation of the unit, we can consider separately the supplementary action of the pistons 15 and 17 of one cylinder of each of the respective pairs. The outlet of cylinder 9 is connected to the inlet of cylinder 11 by channel or passageway 32 extending around the rotor ring abutment 22. With the piston 15 in a position in which its sealing surface is contiguous to a surface of its annular cylinder 9, and with the leading edge of the piston opposite the edge of the outlet leading to channel 32, the piston 17 is in a position in which its sealing surface is contiguous to a surface of its annular cylinder 11 and with the trailing edge of the piston opposite the edge of the inlet from passage 32 so that the piston of cylinder 9 begins to lose its full sealing effectiveness just as the piston of the other annular cylinder 11 acquires its full sealing effectiveness whereby the action of the two pistons is blended to reduce pulsation substantially. The same analysis applies to the supplementary action of the pistons 14 and 16. This feature of blending the piston action is described more fully in my prior Patent No. 2,614,503, granted October 21, 1952. In the construction there detailed the blending action is explained with reference to single cylinders connected together. From the foregoing description it will be understood that the same principles may be applied to the construction herein shown and described for blending the actions of the pistons of two pairs of connected cylinders.

Casing 7 is built up of a series of flat plates 34 to 45 inclusive (Fig. 1). The outer cylindrical walls of the cylinders are formed by plates 38 and 43, and the side walls of the cylinders are formed by the plates 37, 39, 42 and 44. Plates 41 and 45 accommodate suitable anti-friction bearings for the shafts 24 to 27 inclusive of the one set of four cylinders, and plates 36 and 40 accommodate the bearings for the shafts of the second set of four cylinders. These plates likewise are provided with recesses 46 to receive couplings 47 connecting the respective axially aligned shafts of the two sets of cylinders and the respective shafts 48 to 51 inclusive.

In considering the structure thus far described, it may be helpful to observe that the embodiment selected for purposes of illustration is what will be recognized as a two-place unit in which parts 36 to 40 inclusive, together with the associated shafts and pistons, are substantial duplicates of parts 41 to 45 inclusive with the associated shafts and pistons.

Figure 3:
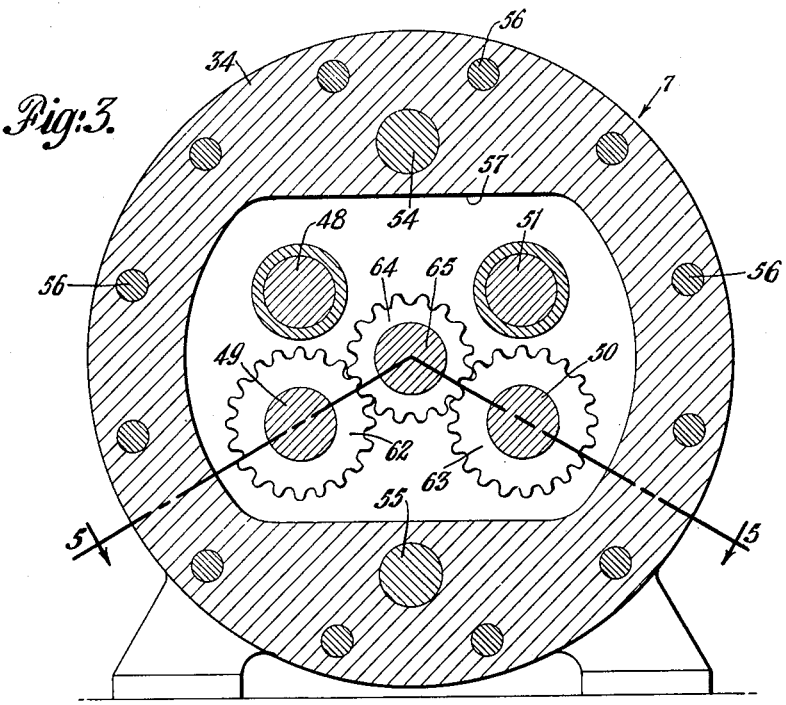
Fig. 3 is a vertical transverse cross-sectional view taken on the line 3—3 of Fig. 1.
Figure 4:
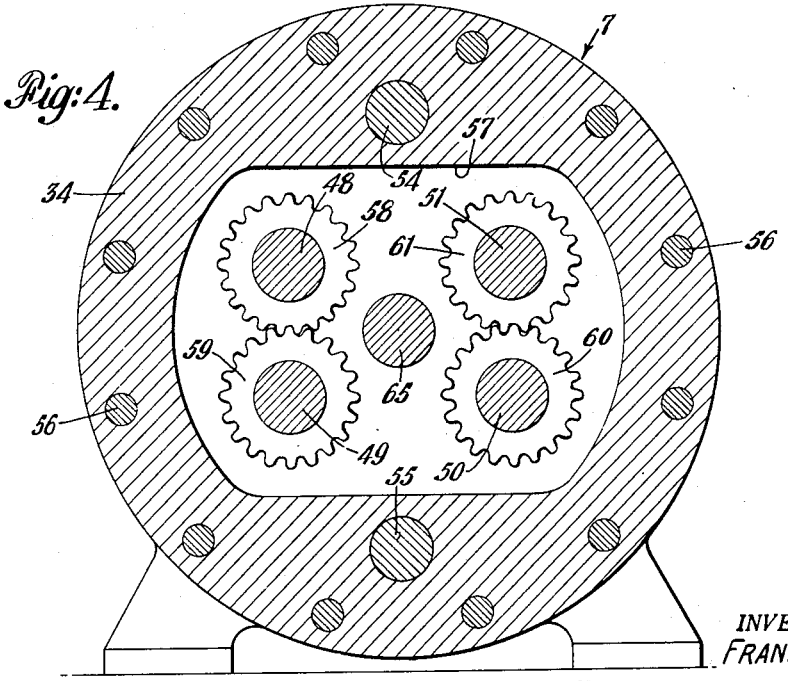
Fig. 4 is a similar view taken on the line 4—4 of Fig. 1.

The casing assembly is completed by end casing members 52, 52' and 53, and these members together with the plate members 34 to 45 inclusive are secured together in proper alignment by means of aligning pins 54, 55 and a series of bolts 56, these pins and bolts extending through aligned openings in the several casing members. Casing member 34 is recessed at 57 to receive pinions 58, 59, 60 and 61 fixed to the ends of shafts 48, 49, 50 and 51 respectively. End casing member 52 is recessed to receive suitable anti-friction bearings at the outer ends of these shafts as clearly shown in the drawings. Also received within recess 57 of the plate 34 are pinions 62 and 63 keyed to shafts 49 and 50, and pinion 64 keyed to drive shaft 65 (Figs. 1, 3 and 5). Pinions 58 and 59 gear pistons 14 and 15 together for operation in 1:1 ratio, and pinions 60 and 61 do the same for the other pair of pistons. Pinion 64 is in mesh with both pistons 62 and 63 and thus provides a common drive for the operating elements of the two pairs of cylinders. The outer end of drive shaft 65 is provided with suitable anti-friction bearings and stuffing box structure as clearly shown in Fig. 5. Inasmuch as conventional parts may be used for the purposes indicated, a detailed description of these parts will be unnecessary.

Casing 7 is provided with an inlet passage 66 and outlet passage 67 for each set of four cylinders—i. e. for each "place" of the unit. As previously noted, the particular construction shown in the drawings may generally be referred to as a "two-place" unit. When this means is that there are two parallel streams flowing through the unit. It is perfectly feasible to utilize any multiple of the two pairs of annular cylinders 8, 9 and 10, 11 (i. e. four pairs, eight pairs, twelve pairs, etc.). The inlets and outlets 66, 67 of the several sets of cylinders, or several places, of the unit described, are connected through suitable manifolds to a common fluid intake and a common point of fluid delivery. The unit will be connected to an external source of fluid pressure or to a device utilizing fluid pressure, as the case may be, and depending upon whether the unit is being operated as a motor or as a pump.

The unit may be designed for simultaneous operation of two of the sets of cylinders in parallel, or it may be designed for selective operation of any multiple of the basic two pairs of cylinders, as may be desired to meet a given load condition. This selective operation may be controlled either manually, or automatically, as for example with the use of the type of automatic control disclosed and claimed in my prior Patent No. 2,536,486, granted January 2, 1951. Inasmuch as these fluid controls do not form a part of my present invention, it will be unnecessary to describe them in more detail here.

In the case of units designed for operation with, or on, non-compressible fluids, such as water or oil, the cylinders preferably should be of substantially equal cross-sectional area, and it is desirable also that the connecting passages between successive pairs of cylinders be of substantially the same cross-sectional area as the combined cross-sectional areas of the two cylinders of a pair.

In the case of units designed for operation with, or on, compressible fluids, it is preferable to use cylinders of larger cross-sectional area, or capacity, for one of the sets (two pairs) than for the other. This may be very simply done by making plate 43 thicker than plate 38 (see Fig. 1), and similarly making the pistons 14 to 17, and rotors 20 to 23, of correspondingly greater width in order to fit the wider cylinders thus provided. An alternative would be to make the cylinders larger in diameter and increase the length of the pistons radially. In such a unit the outlet passage 67 from one set of two pairs of cylinders would be connected to the inlet passage 66 of the second set of two pairs of cylinders. Thus the two sets of cylinders are connected in series without a manifold instead of being connected in parallel with a manifold. The passages between the two sets of cylinders may be tapered so as to be progressively increasing cross-sectional area, in this respect utilizing the invention and principles of my Patent No. 2,447,929, granted August 24, 1948. One of the inherent characteristics of my unit as applied to compressors or expanders is that the ratio of compression or expansion, as the case may be, is based upon the volume of two successive pairs of cylinders plus connecting passages. That is, a pair of pistons in their operating strokes is working against a final head constituted by the second succeeding pair of cylinders. This is because on one of the pairs of cylinders is always being by-passed.

As has been noted hereinabove it is possible to use any number of multiples of the two pairs of cylinders, and in the unit specifically illustrated two duplicate sets of two pairs each are employed. Thus the section of the unit which comprises plates 36 to 40 inclusive with associated operating elements is a duplicate of the section comprising plates 41 to 45 inclusive with associated operating elements. In these two sections plate members 36, 40, 41 and 45 are duplicate parts. Similarly, plates 37, 39, 42 and 44 are duplicate parts, and plates 38 and 43 are duplicate parts. Furthermore the eight separate piston rotor and shaft parts are, or can be, duplicates of one another. Thus there are only four basic parts for each section of the unit and these basic parts are duplicated in every other section of an hydraulic pump, motor or transmission. With particular reference to Fig. 1, it will be understood that additional sections or "places" can be added as desired by simply removing the end plate 53 and lengthening the aligning pins 54, 55 and the bolts 56. Therefore, with the four basic parts referred to, the capacity of the unit may be increased at will by adding additional sections. Of course it is necessary to provide an extra manifold section, or a lengthened manifold; otherwise nothing more is needed than the couplings 47.

Another advantage of the particular construction shown is that the piston rotor rings 20, etc. being integral with, or fixed to, the shafts 24, etc., serve to position the operating elements without the use of thrust bearings at the ends of the shafts. The thrust is taken between the rotor rings and the surfaces of the plates 42, 44, etc. This also gives a pressure balanced construction, minimizing wear, facilitating assembly, and making manufacturing tolerances somewhat less critical.

While the two pairs of cylinders preferably are all arranged in a common plane as shown, it is primarily essential only that the cylinders of each pair be arranged in such a common plane. Elimination of the need for a separate abutment valve is accomplished by using an arrangement as described, one of the characteristics of which is that the cylinders of each pair are in a common plane. A further advantage from the standpoint of simplicity of construction of the connecting passage between the two pairs of cylinders is achieved by having all four cylinders of the two pairs arranged in a common plane.

In Fig. 6 I have illustrated a slightly modified construction. Here the operating elements and cylinder construction are the same as have been described with reference to Figs. 1 to 5 inclusive, and like reference numerals have been applied to the similar parts as required. The modification consists in changing the form of the connecting passage between the two pairs of cylinders 8, 9 and 10, 11, a single passage 68 taking the place of the channels 32 and 33 previously described with particular reference to Fig. 2.

The terms and expressions which I have employed are used in a descriptive and not a limiting sense, and I have no intention of excluding such equivalents of the invention described, or of portions thereof, as fall within the purview of the claims.

I claim:

1. A fluid power device of the class described comprising a casing having at least four annular cylinders each of which has a fluid inlet and a fluid outlet, a shaft disposed centrally with respect to each of the annular cylinders, a piston slidably received in each of said annular cylinders and fixed to the shaft disposed centrally thereof, a cylindrical abutment with a recess to clear each of said pistons, the cylindrical abutments and recesses being formed as elements fixed to each piston with the recess adjacent the piston, the annular cylinders being arranged in pairs with the pistons and recesses of each pair arranged so that the pistons of one cylinder of the pair clears through the recess of the other cylinder of the pair while the piston of said other cylinder clears through the recess of the first, leaving the cylinders of said pair open between their inlets and outlets to by-pass fluid to or from another of said pairs of cylinders, and a fluid passage connecting the outlets of said one pair of cylinders to the inlets of said other pair of cylinders, the pistons of said one pair of cylinders being in operation in their respective cylinders when said other pair of cylinders are by-passing fluid and the pistons of said other pair of cylinders are passing through the respective abutment recesses.

2. A fluid power device as defined by claim 1 in which said cylinders are arranged in a common plane.

3. A fluid power device as defined by claim 1 in which said cylinders are of substantially equal cross-sectional area.

4. A fluid power device as defined by claim 1 in which said cylinders are arranged in a common plane and are of substantially equal cross-sectional area.

5. A fluid power device of the class described comprising a casing having four annular cylinders arranged substantially in a common plane and each having a fluid inlet and a fluid outlet, a shaft disposed centrally with respect to each of the annular cylinders, a piston slidably received in each of said annular cylinders and fixed to the shaft disposed centrally thereof; each shaft having an abutment section with a recess therein, the annular cylinders being arranged in two pairs with the pistons and recesses of each pair arranged so that the piston of one cylinder of the pair clears through the recess of the other cylinder of the pair while the piston of said other cylinder clears through the recess of the first, leaving the cylinders of said pair open between their inlets and outlets to by-pass fluid to or from the other pair of cylinders, and a fluid passage connecting the outlets of the one pair of cylinders to the inlets of the other pair of cylinders, the pistons of said one pair of cylinders being in operation in their respective cylinders when said other pair of cylinders are by-passing fluid and the pistons of said other pair of cylinders are passing through the recesses of the respective abutment sections.

6. A fluid power device as defined by claim 5 in which said cylinders are of substantially equal cross-sectional area.

References Cited in the file of this patent

UNITED STATES PATENTS

| | | |
|---|---|---|
| 1,214,300 | Grouvelle et al. | Jan. 30, 1917 |
| 2,256,743 | Kleckner | Sept. 23, 1941 |
| 2,309,443 | Cluthbert | Jan. 26, 1943 |

FOREIGN PATENTS

| | | |
|---|---|---|
| 203,759 | Switzerland | June 16, 1939 |
| 396,801 | Great Britain | Aug. 14, 1933 |